US008276185B2

(12) United States Patent
Messina et al.

(10) Patent No.: US 8,276,185 B2
(45) Date of Patent: Sep. 25, 2012

(54) ENHANCED SECURITY MEMORY ACCESS METHOD AND ARCHITECTURE

(75) Inventors: Marco Messina, Augusta (IT); Antonino Capri', Villafranca T. (IT); Salvatore Giove, Bari (IT); Antonino La Spina, Ramacca (IT); Vijay Malhi, Cannizzaro (IT)

(73) Assignee: Micron Technology, Inc., Boise, ID (US)

( * ) Notice: Subject to any disclaimer, the term of this patent is extended or adjusted under 35 U.S.C. 154(b) by 1140 days.

(21) Appl. No.: 11/337,085

(22) Filed: Jan. 19, 2006

(65) Prior Publication Data

US 2007/0192828 A1 Aug. 16, 2007

(30) Foreign Application Priority Data

Jan. 19, 2005 (EP) .................................... 05100308
Jan. 19, 2005 (EP) .................................... 05100310

(51) Int. Cl.
*G06F 21/00* (2006.01)
(52) U.S. Cl. ............ 726/2; 713/155; 713/186; 713/189; 705/72; 380/201; 370/335
(58) Field of Classification Search ....... 726/2; 713/193
See application file for complete search history.

(56) References Cited

U.S. PATENT DOCUMENTS

| 4,549,075 | A | | 10/1985 | Saada et al. | |
| 4,677,544 | A | * | 6/1987 | Kinoshita | 713/600 |
| 4,944,008 | A | * | 7/1990 | Piosenka et al. | 380/46 |
| 5,513,136 | A | | 4/1996 | Fandrich et al. | |
| 5,623,637 | A | * | 4/1997 | Jones et al. | 711/164 |
| 5,828,753 | A | * | 10/1998 | Davis | 713/189 |
| 5,942,985 | A | * | 8/1999 | Chin | 340/5.61 |
| 5,974,500 | A | | 10/1999 | Maletsky et al. | |
| 6,154,819 | A | | 11/2000 | Larsen et al. | |

(Continued)

OTHER PUBLICATIONS

Kato et al., "A secure flash card solution for remote access for mobile workforce", Consumer Electronics, IEEE Transactions on Date of Publication: Aug. 2003, vol. 49, Issue: 3,On pp. 561-566.*

(Continued)

*Primary Examiner* — Taghi Arani
*Assistant Examiner* — Morshed Mehedi
(74) *Attorney, Agent, or Firm* — Schwegman, Lundberg & Woessner, P.A.

(57) ABSTRACT

A memory device includes: at least one storage area for storing data; a protection control structure adapted to selectively allow an external device access to the at least one storage area of the memory, the storage area being not freely accessible by the external device if protected; a control logic adapted to identify an access request by the external device to the at least one storage area and cooperating with the protection control structure for managing an unlock procedure for selectively granting the external device at least temporary access rights to the storage area if protected; means for providing a first code to the external device in said unlock procedure; means for receiving a second code from the external device in response to said first code; means for verifying validity of the received second code. The means for verifying validity are adapted to ascertain a correspondence of the second code with the first code based on a predetermined relationship. The control logic instructs the protection control structure to grant access to the storage area if the validity of the received second code has been verified. The first code issued by the memory device to the external device upon receiving an access request is changed after performing predetermined number of unlock procedures.

10 Claims, 6 Drawing Sheets

U.S. PATENT DOCUMENTS

| | | |
|---|---|---|
| 6,209,069 B1 | 3/2001 | Baltar |
| 6,792,438 B1 * | 9/2004 | Wells et al. .................. 708/250 |
| 6,907,526 B2 * | 6/2005 | Tanimoto et al. ............. 713/174 |
| 7,143,294 B1 * | 11/2006 | Johnson ........................ 713/189 |
| 7,594,114 B2 * | 9/2009 | Hooker et al. ................ 713/170 |
| 2003/0041253 A1 * | 2/2003 | Matsui et al. ................. 713/189 |
| 2003/0117844 A1 | 6/2003 | Kawamata |
| 2003/0233541 A1 * | 12/2003 | Fowler et al. ................. 713/155 |
| 2004/0034784 A1 * | 2/2004 | Fedronic et al. ............. 713/186 |
| 2004/0049645 A1 * | 3/2004 | Lee et al. ...................... 711/163 |
| 2004/0059883 A1 * | 3/2004 | Oikawa et al. ................ 711/163 |
| 2004/0059925 A1 * | 3/2004 | Benhammou et al. ........ 713/189 |
| 2004/0088480 A1 * | 5/2004 | Fox et al. ....................... 711/112 |
| 2004/0128527 A1 * | 7/2004 | Witt, Jr. ......................... 713/200 |
| 2004/0160305 A1 * | 8/2004 | Remenih et al. ............ 340/5.22 |
| 2004/0236919 A1 * | 11/2004 | Okaue et al. .................. 711/164 |
| 2004/0260932 A1 * | 12/2004 | Blangy et al. ................. 713/189 |
| 2005/0010756 A1 * | 1/2005 | Clerc ............................. 713/155 |
| 2005/0050283 A1 * | 3/2005 | Miller et al. .................. 711/150 |
| 2005/0060508 A1 * | 3/2005 | Rischar et al. ................ 711/163 |
| 2005/0070276 A1 * | 3/2005 | McGarry .................. 455/432.2 |
| 2005/0102517 A1 * | 5/2005 | Paddon et al. ................ 713/168 |
| 2005/0177522 A1 * | 8/2005 | Williams ......................... 705/72 |
| 2005/0182951 A1 * | 8/2005 | Sohn ............................. 713/189 |
| 2005/0206499 A1 * | 9/2005 | Fisher .......................... 340/5.73 |

OTHER PUBLICATIONS

European Search Report for EP 05 10 0308 dated Apr. 22, 2005.
European Search Report for EP 05 10 0310 dated May 31, 2005.

* cited by examiner

ENHANCED SECURITY MEMORY ACCESS METHOD AND ARCHITECTURE

PRIORITY CLAIM

This application claims priority from European patent application Nos. EP05100310.1 and EP05100308.5, both filed Jan. 19, 2005, which are incorporated herein by reference.

CROSS REFERENCE TO RELATED APPLICATIONS

This application is related to U.S. patent application Ser. No. 11/336,411 entitled METHOD AND ARCHITECTURE FOR RESTRICTING ACCESS TO A MEMORY DEVICE, which has a common filing date and owner and which is incorporated by reference.

TECHNICAL FIELD

The present invention relates generally to the field of integrated circuits, and more specifically to semiconductor memories.

BACKGROUND

In the field of semiconductor memories, flash memories have become rather popular, because they combine the capability of storing relatively large amounts of data with the possibility of modifying their content directly in the field.

Flash memories are, for example, used to store the code to be executed by data processing units (e.g., microcontrollers, microprocessors, coprocessors, digital signal processors and the like) in a variety of electronic apparatuses, such as personal computers, mobile phones, digital cameras, set-top boxes for cable or satellite or digital terrestrial television, just to mention a few.

In particular, using flash memories it is possible to modify the stored code without having to remove the memory component from the respective socket. It has thus become possible to, e.g., change the code, fix code bugs, update the code version directly at the premises of the users; the new code can be for example downloaded over the internet, or received directly by the mobile phone from the service provider company.

There are applications in which these possibilities offered by flash memories raise problems of security. Electronic piracy acts may for example cause the code stored in the memory to be read without authorization or to be corrupted.

Referring to a conventional flash memory, the modification of the data stored in the memory is related to the erase and program operations. Stored data can be shielded from undesired read, erase and program operations by means of particular protection arrangements, that allow to selectively protect/ unprotect distinct sectors of the memory. For example, U.S. Pat. No. 5,974,500 describes a non-volatile memory device comprising a set of first access control bits to control the access authorization (to perform the operations of erasing, programming and reading) to the memory array, and a set of second control bits to control write access to the first access control bits, in such a way to consent to the changing of the memory access authorization. Every time the external devices request an access operation to the memory, they must provide their access authorizations thereto. In fact, according to this solution, to access a protected memory zone, it is necessary to change the memory access authorization; however, this change is performed without any particular security protocol, simply by issuing, on the part of the external device, a request to modify the access authorization; there is no control on which device is requesting to change the access authorization scheme.

Therefore, in view of the state of the art outlined in the foregoing, a need has arisen for a technique to implement security in a semiconductor memory, and particularly in respect of aspects relating the grant of access authorization to external devices in an efficient way, assuring a high level of security.

SUMMARY

According to an embodiment of the present invention, a memory device includes at least one storage area for storing data and a protection-control structure adapted to selectively allow an external device access to the at least one storage area of the memory. Such storage area is not freely accessible by the external device if protected. The memory device further includes a control logic adapted to identify an access request by the external device to the at least one storage area and to cooperate with the protection control structure for managing an unlock procedure for selectively granting the external device at least temporary access rights to the storage area if protected. The memory device further includes means for providing a first code to the external device in said unlock procedure; means for receiving a second code from the external device in response to said first code; and means for verifying validity of the received second code. Said means for verifying validity are adapted to ascertain a correspondence of the second code with the first code based on a predetermined relationship, and said control logic instructs the protection control structure to grant access to the storage area if the validity of the received second code has been verified. Said first code is changed after performing a predetermined number of unlock procedures.

According to another embodiment of the present invention, a method to allow access to a memory device by an external device includes: receiving at the memory device an access request to a selected storage area by the external device; in case the selected storage area is not a freely accessible area, performing an unlock procedure. Said unlock procedure includes having the memory issuing to the external device a first code; at the external device, receiving the first code and, responsive thereto, sending to the memory device a second code depending on the first code; at the memory device, at least temporarily unlocking the selected storage area to allow access thereto by the external device based on the received second code.

Said first code issued by the memory device to an external device upon receiving an access request is changed after performing predetermined number of unlock procedures.

Other embodiments of the present invention regard an electronic device adapted to interact with a memory device of the previous embodiment, and an electronic system including such a memory device and electronic device.

BRIEF DESCRIPTION OF THE DRAWINGS

Features and advantages of the present invention will be made clear by the following detailed description of embodiments thereof, provided purely by way of a non-limitative example, with reference to the attached drawings, wherein.

DETAILED DESCRIPTION

Figure 1:
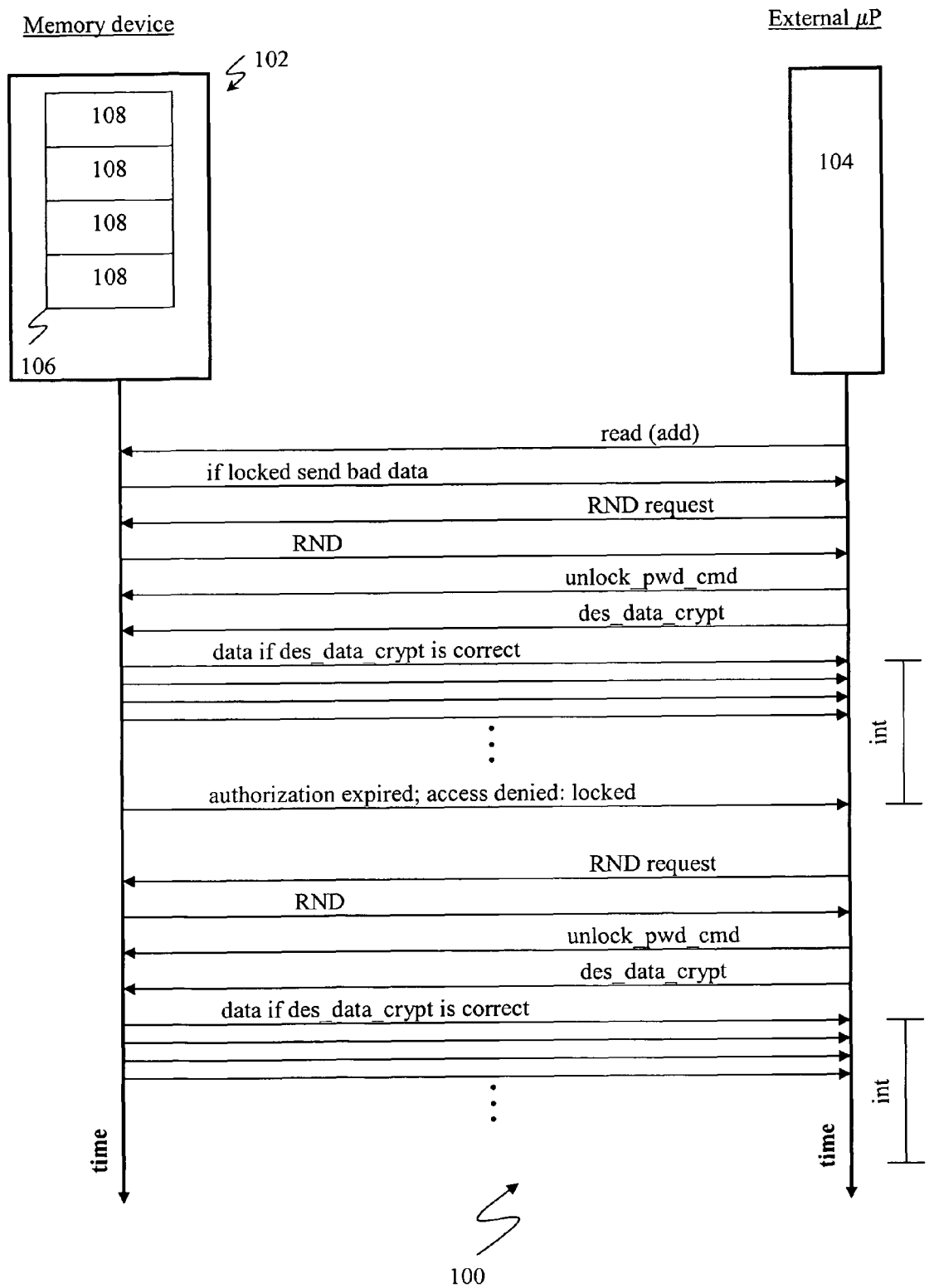
FIG. 1 is a diagram illustrating a dialoguing sequence between a memory device and an external device, e.g. a microprocessor, according to an embodiment of the present invention.

With reference to the drawings, FIG. 1 is a diagram that illustrates, in a simplified way, a dialoguing sequence 100 between a memory device 102 and an electronic device, in the example a microprocessor 104 external thereto, implementing a memory access method including an access protocol scheme according to an embodiment of the present invention. The memory device 102 includes a memory matrix 106 of memory cells, forming the storage area of the memory, and several devices that contribute to its functioning, that are not shown in FIG. 1, being either known per se or described later on (in connection with FIG. 2). The memory matrix 106 is divided into a plurality of n memory zones 108, each one including a corresponding plurality of memory cells. The external microprocessor 104 represents any electronic system intended and adapted to interact with the memory device 102. The external microprocessor 104 may, for example, control the memory device 102 in such a way to require the reading of particular data stored in selected groups of memory cells thereof. More particularly, the dialoguing sequence 100 illustrated in the figure relates to a case wherein an address of the memory cells that are to be accessed by the external microprocessor 104 for reading the stored content corresponds, i.e. falls in a range of addresses, corresponding to a "protected" memory zone 108 of the memory matrix 106. By protected memory zone there is intended a zone of the storage area of the memory device that is not freely accessible by e.g. external devices; in particular the dialoguing sequence 100 includes a sequence of operations adapted to "unlock" the (protected zone of the) memory device, said unlock-operations sequence enabling the external microprocessor 104 to obtain the right of accessing in reading the addressed memory cells belonging to the protected memory zone 108.

Quite schematically, the external microprocessor 104 executes a read(add) operation on the memory device 102 for requesting the memory device 102 to read the content of the memory cells of the memory matrix 106 corresponding to the address add.

Let it be assumed that the address add provided by the external microprocessor 104 corresponds to a protected memory zone 108 of the memory matrix 106, i.e., according to the definition given above, a memory zone that is not freely accessible. The memory device 102 denies the reading access to the external microprocessor 104, and wrong data are for example provided (the microprocessor can recognize that the data are wrong by checking the data validity in a status register).

Once the external microprocessor 104 has realized that the reading access has been denied, it triggers an unlocking sequence, directed to be granted access right to the protected memory zone and obtain the reading of the data stored in the memory matrix 106 in the location(s) corresponding to the specified address add. In particular, the unlocking sequence is started by the external microprocessor 104 requesting the memory device 102 provide a code, which the microprocessor will use to generate an unlocking password. The memory device for example generates a random number RND (e.g. 64-bit long) and makes it available to the microprocessor 104.

The external microprocessor 104 encrypts the received code RND by means of a predetermined encryption algorithm, e.g. a DES (Data Encryption Standard) algorithm, using a predetermined encryption key, obtaining as a result an encrypted code des_data_crypt, for example of 64 bits, which is an encrypted version of the code RND issued by and received from the memory device 102; the encrypted code des_data_crypt will be exploited as an unlock password that the microprocessor 104 provides to the memory device 102 for being granted the access authorization. From now on, for the purposes of the present description, by "encryption process" there is intended a process of encrypting and/or decrypting data. Once the encryption of the code RND has been completed, the external microprocessor 104 communicates to the memory device 102 that it is ready to convey the unlock password by means of an unlock_pwd_cmd command. Subsequently, the external microprocessor 104 sends to the memory device 102 the unlock password des_data_crypt.

The memory device 102 decrypts the received password des_data_crypt using a suitable decryption algorithm, e.g. the DES algorithm, and a decryption key, which may be stored therein, for example in the memory matrix 106 (preferably in a protected, non-externally accessible area thereof), or in a separate storage area non-accessible to the external user. The decryption of the received password des_data_crypt produces a code, e.g. 64-bit long, which is used by the memory for establishing whether or not the external microprocessor 104 is authorized to access the protected memory zone 108. The external microprocessor 104 is granted access right and allowed to read the data stored in the addressed location(s) of the protected memory zone 108 of the memory matrix 106 if the code obtained by decrypting the password des_data_crypt is equal or, generally, corresponds to the previously generated code RND; in this case, the memory device 102 unlocks the protected memory zone. This in fact means that the encryption algorithm and encryption key used by the external microprocessor 104 to encrypt the random number RND are the same as, or corresponds to those used by the memory device 102 to decrypt the password des_data_crypt, and thus the memory device 102 recognizes that the external microprocessor 104 is authorized to read the data stored in the protected memory zone 108 of the memory matrix 106.

After unlocking the protected memory zone 108, the memory device 102 reads the addressed memory cells and makes the requested, valid data available to the external microprocessor 104.

The dialoguing sequence described above provides a significant security, because a protected memory zone is not unlockable by whichever external device (i.e., it cannot be rendered freely accessible), but only by authorized ones, having been provisioned of the necessary right, in particular in term of tools (algorithm, key) for encrypting codes sent by the memory.

According to an embodiment of the present invention, for an increased security, the unlocking operations sequence up to now described provides to external devices, e.g. the external microprocessor 104, only a temporary (i.e., limited in time) authorization to read the locations belonging to the protected memory zone which has been unlocked. In fact, after a predetermined time interval int, for example of the order of some milliseconds (e.g., 5 ms), the protected memory zone 108 that has been unlocked returns to a protected states, and the memory device 102 inhibits any further reading access and data transfer to the external microprocessor 104, possibly signaling thereto that the validity of the code RND, and thus of the password des_data_crypt, is expired. Consequently, access requests received by the memory after the expiration of the access authorization to the protected memory zone 108 are again denied (the memory device sends to the external microprocessor 104 mem_zone_prot replies).

Preferably, for an even increased level of security, the expiration of the access authorization to the protected memory zone corresponds to an expiration of the validity of the unlock password des_data_crypt that the external microprocessor 104 provided to the memory device for unlocking the protected memory zone 108, and the memory device 102 locks again the reading access to the addressed memory cells.

To be granted again the authorization of accessing the protected memory zone (or another protected memory zone) authorization, the unlocking operations sequence described above is repeated, preferably having the memory generating and providing to the external microprocessor a new code RND. The external microprocessor 104 encrypts again the newly received code RND, thus obtaining a new unlock password des_data_crypt to be sent to the memory device 102. Once the new password des_data_crypt is received, the memory device 102 decrypts it, and verifies if the obtained decrypted code is equal/corresponds to the new code RND, and, based on the outcome, it grants or not the external microprocessor 104 the access authorization to the addressed memory cells.

In this way, the reading access to the data stored in the locked zones of the memory matrix 106 needs a confirmation after a predetermined time interval. Moreover, the expiration of the unlock password (for example in consequence to the fact that the code RND generated by the memory device 102 changes in reply to successive unlock requests), makes a fraudulent access (for example, by determining the encryption key) very difficult.

Figure 2:
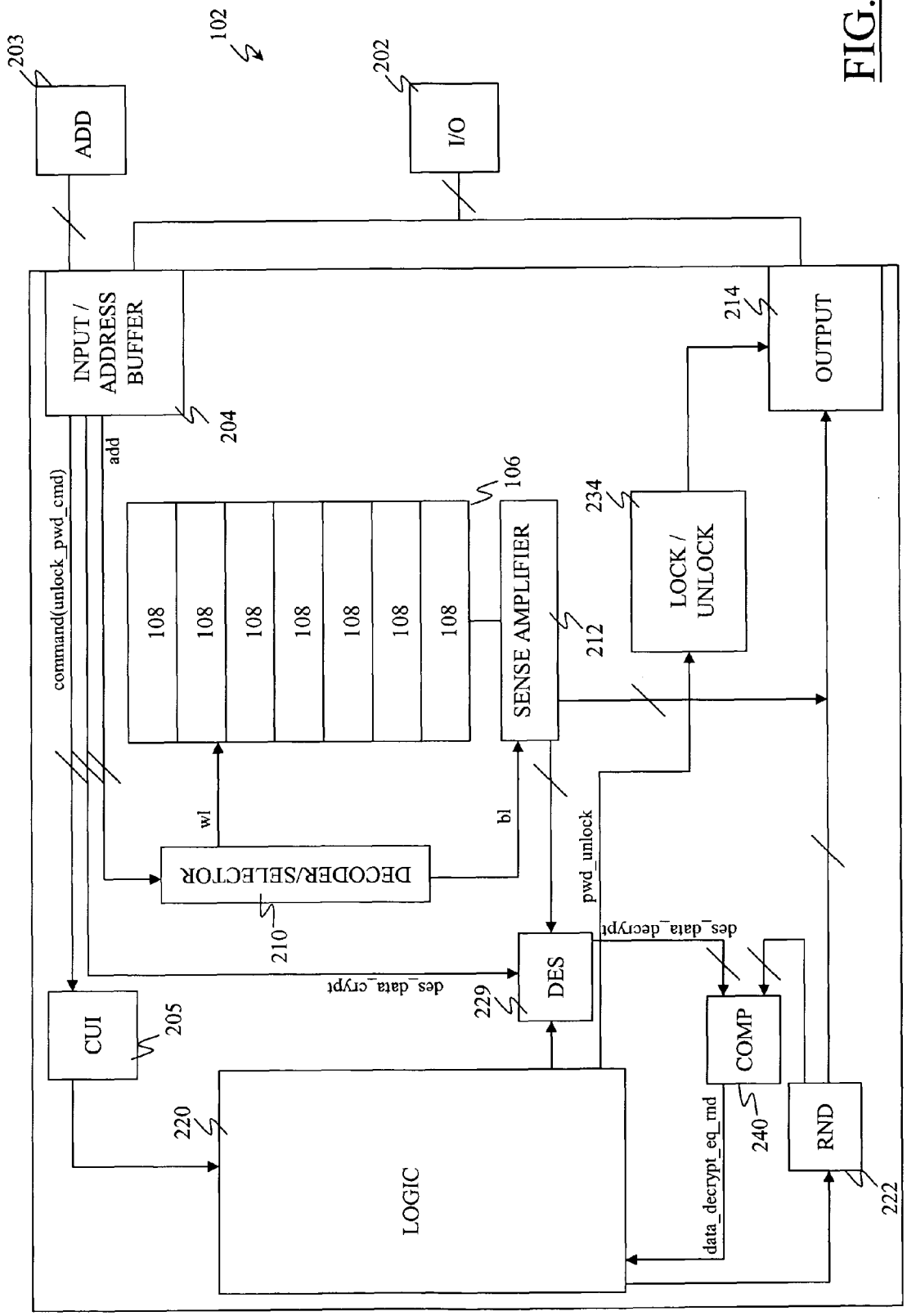
FIG. 2 illustrates a functional block view of the memory device, according to an embodiment of the present invention.

Referring now to FIG. 2, a simplified, functional block diagram of the memory device 102 according to an embodiment of the present invention is illustrated. It is pointed out that only the functional blocks involved in a reading operation on the memory are shown, and, for simplicity of the drawing, signals and corresponding physical lines carrying them are denoted with the same reference numerals.

The memory device 102 interacts with the external environment by means of a plurality of data input/output (I/O) pads 202, for receiving/outputting data (and command codes), and of address pads 203, for receiving address codes adapted to select locations (i.e., memory cells in the memory matrix 106). The pads 202 and 203 are connected to an input block 204, including input buffers for the addresses and the data. The input block 204 is connected, by means of a bus of lines identified as command in the drawing, to a Command User Interface (CUI) 205, and it is further connected, by means of a bus of lines labeled add, to an address decoder and selector block 210 adapted to receive address codes provided for example by the external microprocessor 104; over the bus command, a generic command received by the memory (for example, from the external microprocessor 104) is conveyed to the CUI 205, which decodes the command so as to determine a proper operations sequence; among the others, the CUI receives and decodes the command unlock_pwd_cmd sent by the external microprocessor 104, when it is ready to send the unlock password des_data_crypt to the memory device 102.

The memory matrix 106 includes a plurality of memory cells (not shown in the drawing) arranged in rows and columns, controlled by bit lines and word lines, respectively. The address decoder and selector block 210 receives from the input block 204 the address add corresponding to the memory cells that are to be read, and selects them by means of wordline selection signals wl and bitline selection signals bl. The selected bitlines (normally, a packet of, e.g., eight or sixteen or more bit lines is selected at a time, depending on the degree of parallelism of the memory) are connected to a sense amplifier block 212. The sense amplifier block 212 receives memory cell current values corresponding to the states of the selected memory cells, and provides an amplified full-logic version thereof to a data output block 214, that is connected to the outside by means of the input/output pads 202.

The memory device 102 further includes a logic block 220, interacting with the CUI 205, and responsible of the management of the operations necessary to the functioning of the memory device 102.

The memory device 102 includes a code generator block 222 (e.g., a random number generator adapted to generate random numbers), for generating the 64-bit code RND used during the dialoguing sequence 100 between the memory device 102 and the external microprocessor 104. The code generator block 222 is controlled by the logic block 220, and is for this purpose depicted as connected to the data output block 214 by means of a bus of lines.

The logic block 220 is connected to a memory zone lock/unlock block 234, adapted to manage the protection of the memory zones 108 and to allow/inhibit access thereto according to their protection status. In particular, the lock/unlock block 234 is adapted to check if a received address add corresponds, i.e., falls in a range of addresses corresponding to a protected memory zone 108, and in the affirmative case to inhibit the access to the data stored in the addressed memory cells, for example by controlling the output block 214 so as to selectively enable/disable the transfer of the read data from the sense amplifier 212 to the input/output pads 202.

The logic block 220 further interacts with a DES block 229, including an ensemble of circuital elements (and, possibly, program instructions) adapted to implement the encryption/decryption operations of a DES algorithm. The DES block 229 interacts with the memory matrix 106, for receiving the decryption key stored therein, and with the input block 204, for receiving the unlock password des_data_crypt.

The memory device 102 further includes a comparator block 240 controlled by the logic block 220, adapted to receive from the DES block 229 the decrypted version of the unlock password des_data_crypt and, from the code generator block 222, the code RND.

Under the control of the logic block 220, the DES block 222 loads the decryption key (read from the memory matrix 106) and the unlock password des_data_crypt (received from the external microprocessor 104), and starts a decryption process, to obtain a (e.g., 64-bit) code des_data_decrypt representing a decrypted version of the unlock password; in particular, in the exemplary embodiment of the invention herein described, such a decryption process includes decrypting the received encrypted password des_data_crypt using the decryption key according to a sequence of mathematical operations implementing the DES algorithm. When the decryption process ends, the DES block 229 notifies the logic block 220 and the comparator block 240. The decrypted password des_data_decrypt, generated by the decryption process, is subsequently fed to the (e.g., 64-bit) comparator block 240. The comparator block 240 also receives from the code generator block 222 the code RND.

The comparator block 240 compares the decrypted password des_data_decrypt and the code RND. If the decrypted password des_data_decrypt coincides with the code RND, the comparator block 240 asserts a signal data_decrypt_eq_rnd to inform the logic block 220 of the successful outcome of the comparison.

In this case, the logic block 220 asserts a signal pwd_unlock, that is normally kept deasserted, thus instructing the lock/unlock block 234 to drive the output block 214 so as to enable the data transfer from the sense amplifier block 212 to the input/output pads 202. The external microprocessor 104 is thus authorized to read the data stored in the protected memory zone 108, in particular the data stored in the location(s) corresponding to the address add.

If instead the signal data_decrypt_eq_rnd is set to the low logic value, meaning that the code des_data_decrypt and the code RND are not equal, the memory device 102 preferably signals to the external microprocessor 104 that the unlock request has not been successful, for example issuing a fail notification (not shown in the figures). In this case, the signal pwd_unlock is kept deasserted, so the lock/unlock block 234 continues to inhibit the data transfer by the output block 214 from the sense amplifier block 212 to the input/output pads 202. These situation may typically arise in case the external microprocessor 104 does not have the authorization to obtain the reading of the data stored in the memory matrix 106 corresponding to the address add, not possessing the correct encryption key. Another situation in which this may occur is a possible corruption of the exchanged data (code RND, unlock password) between the memory device and the external microprocessor, for example due to disturbs. The external microprocessor 104 may retry (preferably, for a limited number of times) to be granted the read access authorization to the memory matrix 106, repeating the unlocking process (for example, requesting a new code RND from the memory device 102).

Figure 3:
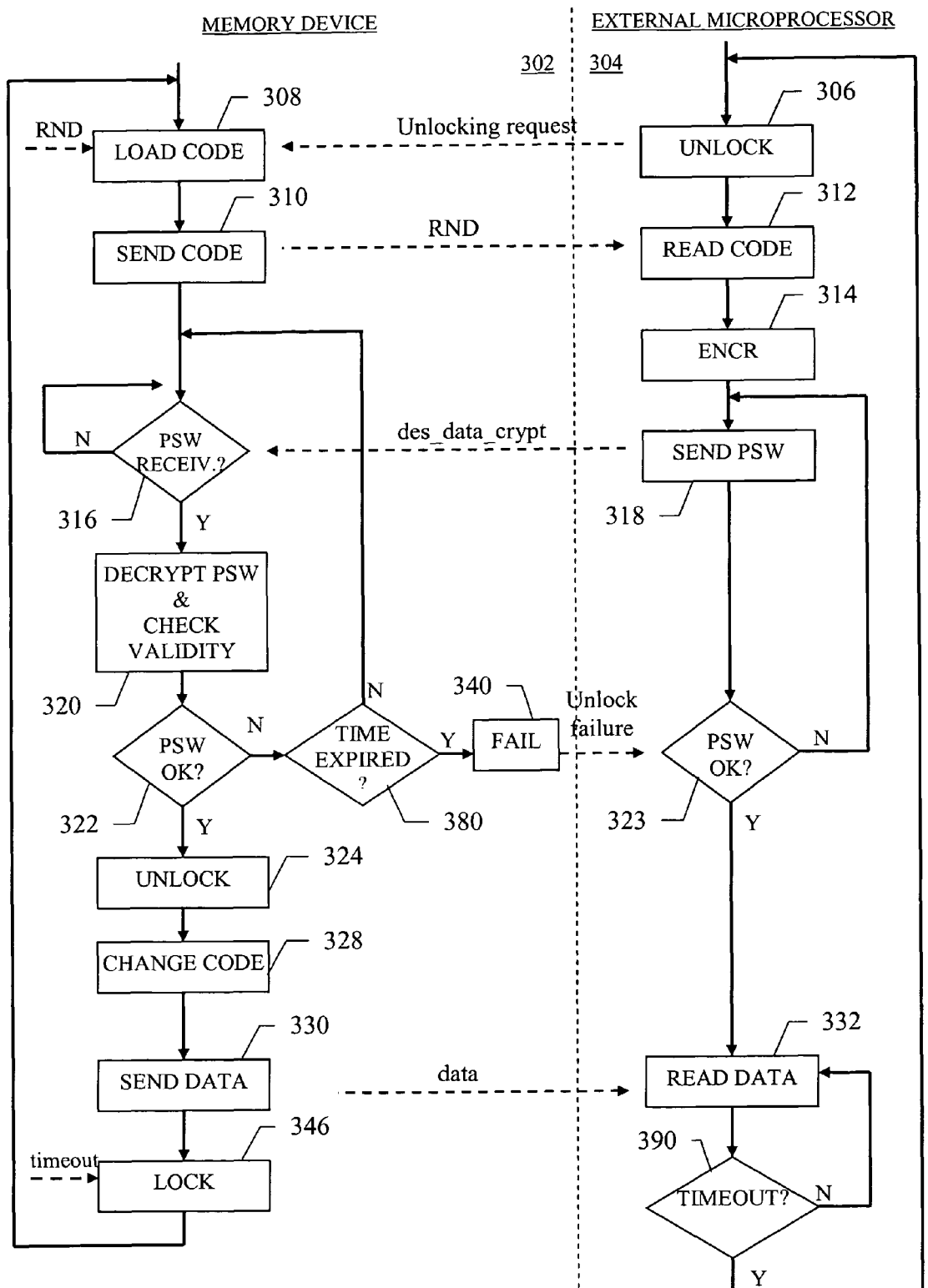
FIG. 3 is a schematic flow chart illustrating in a greatly simplified way operations executed by the memory device and the external microprocessor, according to a first embodiment of the present invention.

Referring to FIG. 3, a flow chart 300 relating to an illustrative implementation of the operations executed by the memory device 102 and the external microprocessor 104 relating the grant of access authorization thereto is illustrated, in a first embodiment of the present invention.

The flow chart 300 progresses between two different "lanes" 302, 304. The blocks of the flow chart 300 belonging to the first lane (lane 302) represent operations executed by the memory device 102, while the blocks belonging to the other lane (lane 304) represent operations executed by the external microprocessor 104.

In response to the notification by the memory device 102 that memory location(s) addressed by the external microprocessor 104 belong(s) to a protected memory zone 108, that is, a memory zone that is not freely accessible, the external microprocessor 104 issues the unlocking request to the memory device 102 (block 306).

Upon receipt of the unlock request, the memory device 102 acquires the code RND from the code generator block 222 (block 308), and sends it to the external microprocessor 104 (block 310).

The external microprocessor 104 receives the code RND sent by the memory device 102 and reads it (block 312). Subsequently, the code RND is encrypted, in such a way to obtain the encrypted password des_data_crypt (block 314).

The memory device 102 keeps the code RND sent to the external microprocessor in order to use it for verifying the unlock password, when the latter will be received from the external microprocessor 104 (decision block 316, exit branch N) (while waiting for the password, the memory device may perform other operations).

When the external microprocessor 104 is ready to do so, it sends the (encrypted) password des_data_crypt to the memory device 102 (block 318).

Once the password des_data_crypt is received (decision block 316, exit branch Y) the memory device 102 decrypts the received password des_data_crypt exploiting the functions of the DES block 229, using the decryption key, thus obtaining a decrypted version thereof des_data_decrypt; the decrypted password is then compared with the code RND previously generated and sent to the external microprocessor, by means of the comparator block 240, as previously explained (block 320).

Based on the comparison of the decrypted password des_data_decrypt with the code RND, the memory device 102 establishes the "validity" of the password des_data_crypt received from the microprocessor 104. The password des_data_crypt is to be intended as "valid" if the decrypted version thereof des_data_decrypt coincides with or corresponds to the code RND. In the affirmative case (decision block 322, exit branch Y), the logic block 220 of the memory device 102 instructs the lock/unlock block 234 to drive the output block 214 so as to enable the data transfer from the sense amplifier block 212 to the input/output pads 202 (block 324).

The logic block 220 of the memory device 102 then controls the code generator block 222 in such a way to trigger the start of the generation of a new code RND (block 328), that will be exploited for a possible successive unlocking operations sequence. A change of the code RND implies a change in the unlock password that the memory expects to receive by an external device, e.g. the external microprocessor 104, in a subsequent unlock request; in this way, the validity of a password is limited to a single access only. This increases the degree of security.

Then, the memory device 102 reads out and makes the addressed data available to the external microprocessor 104 (block 330), which reads the data (block 332).

After the protected memory zone has been unlocked, the microprocessor can access the memory one or more times and, in between consecutive accesses it can perform other operations; thus, block 332 in the drawing should be intended to represent one or more read accesses by the external microprocessor to the (unlocked protected memory zone of the) memory device. As long as a predetermined time interval int is not lapsed, the external microprocessor may go on fetching data from the unlocked protected zone of the memory device (exit branch N of block 390).

After the lapse of a time interval int, the logic block 220 of the memory device 102 instructs the lock/unlock block 234 to drive the output block 214 so as to disable again the data transfer from the sense amplifier block 212 to the input/output pads 202 (block 346). Any further read access attempt by the microprocessor 104 is denied by the memory device 102: consequently, the addressed data become no more available to the external microprocessor 104; the memory device outputs wrong data, the invalidity of which can be detected by the external microprocessor looking at, e.g. a status register of the memory, thereby the external microprocessor receives knowledge of the fact that the authorization to read is expired. In case the external microprocessor 104 needs to fetch further data from the protected zone of the memory device, it may issue another unlocking request to the memory device 102 (output branch Y of block 390, with operation flow jumping back to block 306).

Back to decision block 322, in case the password received from the external microprocessor is found invalid (decision block 322, exit branch N), the memory device may wait a prescribed time (e.g., 10μs) for a new password to be received from the external microprocessor (decision block 380), then it preferably notifies the external microprocessor of the failure of the unlock operation (block 340). In this last case the external microprocessor 104 is not granted the access authorization to the addressed memory cells (the output block 214 inhibits the data transfer from the sense amplifier to the I/O pads). The external microprocessor 104, receiving the unlock failure notification (decision block 323) may retry (preferably for a limited number of times) to be granted the access authorization to the memory matrix 106, repeating some operations of the unlocking process, for example sending again the unlock password (exit branch N of decision block 323, jumping back to the block 318).

It can be appreciated that the increased security given by the change of code to be sent to an external device by the memory may imply that successive unlock requests may be serviced only provided that they do not take place in a too short time for the new code to be generated by the code generator 222.

The generation of a new code may take some time, especially in the case the code is a random number generated by a random number generator.

Generating a random number involves performing a sequence of mathematical operations. In particular, obtaining a random number of sufficient length (in bits) and with a low autocorrelation value (typically necessary for assuring a high level of access security), a quite high number of processing steps may be required, and the time necessary for generating the new code may easily reach the order of 100 μs. Thus, a new unlock request may not be serviced until such a time is lapsed. This may, in some cases, represent a drawback.

Figure 4A:
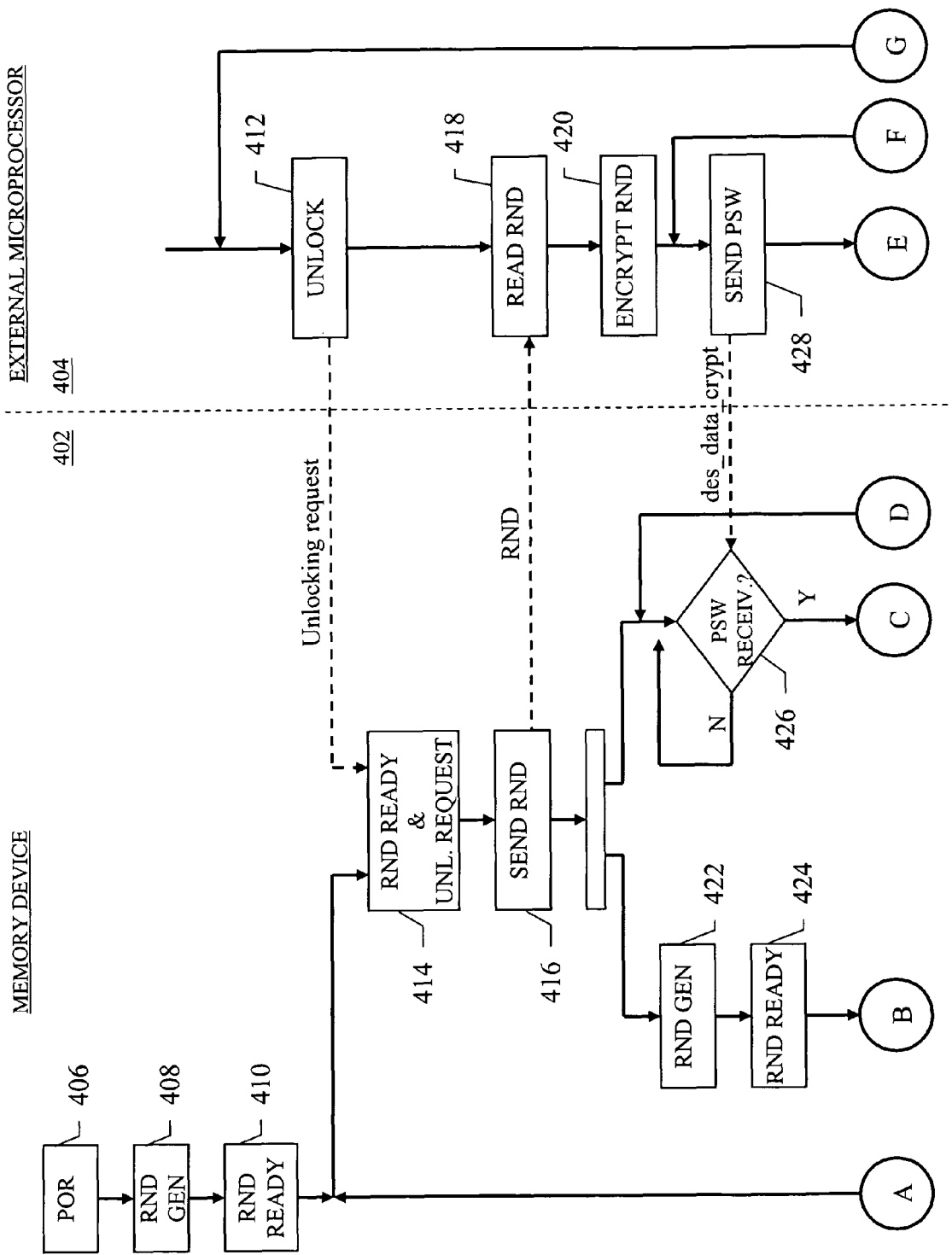
FIGS. 4a, 4b are a schematic flow chart illustrating in a greatly simplified way the operations executed by the memory device and the external microprocessor according to a second embodiment of the present invention.
Figure 4B:
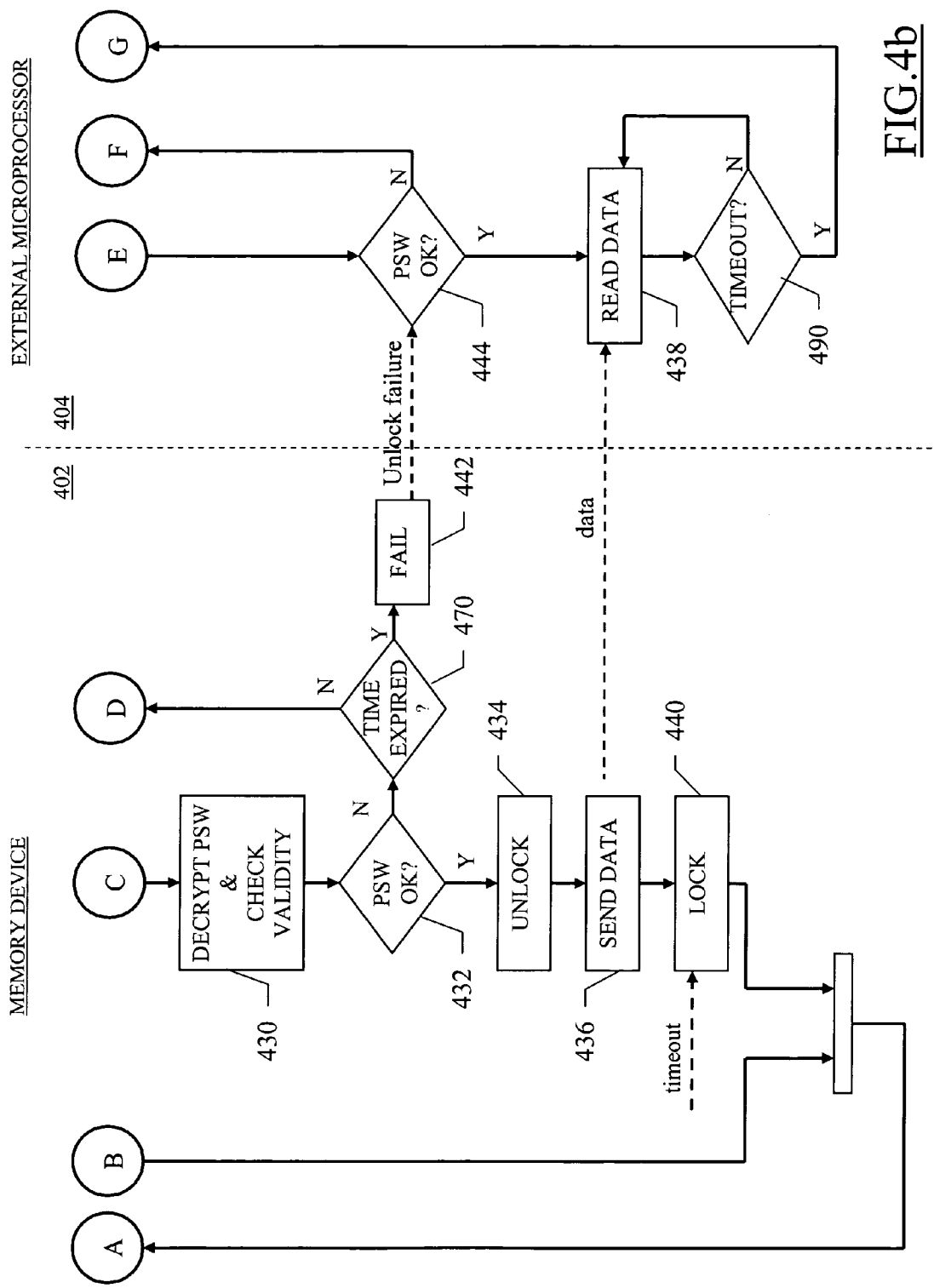

Referring to FIGS. 4a-4b, a simplified flow chart 400 according to an embodiment of the invention adapted to overcome the above-mentioned drawback is illustrated.

Also in this case, the flow chart 400 progresses between two different lanes 402, 404. The blocks of the flow chart 400 belonging to the first lane (lane 402) represent operations executed by the memory device 102, while the blocks belonging to the other lane (lane 404) represent operations executed by the external microprocessor 104.

At the power-on of the memory device 102, a power-on reset procedure is typically initiated (block 406). The power on typically takes a relatively long time, of some hundreds of μs, in order to permit the correct functioning of some device included in it. For example, charge-pump voltage boosters embedded in the memory device for generating the voltages required to perform some operations of the memory cells of the memory matrix 106, such as erasing, programming and, possibly reading, may necessitate a relatively long period of time for generating a stable output voltage.

Expediently, immediately after the start of the power on (for example, when the power-on reset procedure is started), the memory device 102 starts the operations for generating a new code, particularly a random number RND (block 408). To this purpose, the code generator block 222 is started. It is noted that the duration of the operations of the random number RND generation may be less than (or equal to) the settling time of the charge pumps of the memory device 102. However, the code generator block 222 may be realized in a way that does not necessitate the voltages (usually higher than the supply voltage) generated by the charge pumps; thus, the random number generator may perform the operations to generate the random number code RND during the power on of the memory device, saving time. In this way, the random number code RND will be immediately ready for the first possible unlock request received after the power on by an external device, e.g. the external microprocessor 104.

When the code generator block 222 has performed the necessary operations, the random number code RND is ready to be sent (block 410).

Let it be assumed that, at a given time after the memory device power on, the external microprocessor 104 tries to access a protected zone 108 of the memory, and that the memory device denies access and issues a notification (as described in the foregoing in connection with FIG. 1).

In response to the notification that the addressed memory cells of the memory matrix 106 belong to a protected zone 108, the external microprocessor 104 issues an unlocking request to the memory device 102 (block 412).

The random number code RND has already been generated during the power on procedure, and is therefore ready to be sent; upon receipt of the unlock request by the microprocessor (block 414), the memory device 102 acquires the code RND from the code generator block 222 and sends it to the external microprocessor 104 (block 416).

The external microprocessor 104 receives the code RND sent by the memory device 102 and reads it (block 418). Subsequently, in the block 420, the code RND is encrypted, in such a way to obtain the encrypted password des_data_crypt.

After the block 416, the flow of activity of the memory device 102 forks into two branches.

In a first branch the memory device 102 performs the unlocking operations, similarly to the case explained in connection with the flowchart of FIG. 3.

More particularly, the memory device 102 keeps the code RND sent to the external microprocessor in order to use it for verifying the unlock password, when the latter will be received from the external microprocessor 104 (decision block 426, exit branch N) (while waiting for the password, the memory device may perform other operations).

When the external microprocessor 104 is ready to do so, it sends the (encrypted) password des_data_crypt to the memory device 102 (block 428).

Once the password des_data_crypt is received (decision block 426, exit branch Y) the memory device 102 decrypts the received password des_data_crypt exploiting the functions of the DES block 229, using the decryption key, thus obtaining a decrypted version thereof des_data_decrypt; the decrypted password is then compared with the code RND previously generated and sent to the external microprocessor, by means of the comparator block 240, as previously explained (block 430).

Based on the comparison of the decrypted password des_data_decrypt with the code RND, the memory device 102 establishes the "validity" of the password des_data_crypt received from the microprocessor 104. The password des_data_crypt is to be intended as "valid" if the decrypted version thereof des_data_decrypt coincides with or corresponds to the code RND. In the affirmative case (decision block 432, exit branch Y), the logic block 220 of the memory device 102 instructs the lock/unlock block 234 to drive the output block 214 so as to enable the data transfer from the sense amplifier block 212 to the input/output pads 202 (block 434).

Then, the memory device 102 reads out and makes the addressed data available to the external microprocessor 104 (block 436), which reads the data (block 438).

After the protected memory zone has been unlocked, the microprocessor can access the memory one or more times and, in between consecutive accesses it can perform other operations; thus, block 438 in the drawing should be intended to represent one or more read accesses by the external microprocessor to the (unlocked protected memory zone of the) memory device. As long as a predetermined time interval int is not lapsed, the external microprocessor may go on fetching data from the unlocked protected zone of the memory device (exit branch N of block 490).

After the lapse of a time interval int, the logic block 220 of the memory device 102 instructs the lock/unlock block 234 to drive the output block 214 so as to disable again the data transfer from the sense amplifier block 212 to the input/output pads 202 (block 440). Any further read access attempt by the microprocessor 104 is denied by the memory device 102: consequently, the addressed data become no more available to the external microprocessor 104; the memory device outputs wrong data, the invalidity of which can be detected by the external microprocessor looking at, e.g. a status register of the memory, thereby the external microprocessor obtains knowledge of the fact that the authorization to read is expired. In case the external microprocessor 104 needs to fetch further data from the protected zone of the memory device, it may issue another unlocking request to the memory device 102 (output branch Y of block 490, with operation flow jumping back to block 412).

Back to decision block 432, in case the password received from the external microprocessor is found invalid (decision block 432, exit branch N), the memory device may wait a prescribed time (e.g., 10 μs) for a new password to be received from the external microprocessor (decision block 470), then it preferably notifies to the external microprocessor of the failure of the unlock operation (block 442).

In this last case the external microprocessor 104 is not granted the access authorization to the addressed memory cells (the output block 214 inhibits the data transfer from the sense amplifier to the I/O pads). The external microprocessor 104, receiving the unlock failure notification (decision block 444) may retry (preferably for a limited number of times) to be granted the access authorization to the memory matrix 106, repeating some operations of the unlocking process, for example sending again the unlock password (exit branch N of decision block 444, jumping back to the block 428).

In parallel to the operations just described, the memory device 102 (second branch of the flowchart), performs the operations necessary for generating a new random number code RND; in particular, similarly to the operations performed during the power-on, the memory device 102 starts the operations for generating a new random number code RND (block 422). To this purpose, the code generator block 222 is started. When the code generator block 222 has performed the necessary operations, the random number code RND is ready to be sent (block 424).

The unlocking operations (first branch of the flowchart) do not involve the use of the code generator block 222, so the generation of the new random number code can be carried out in parallel to the operations performed in the first branch.

Note that, provided the memory is ready to provide to the external microprocessor a random code RND when requested, the operations of receiving the password, checking the validity thereof, reading the accessed locations, and providing the read data to the external microprocessor are typically quite fast, taking a time which is significantly shorter (1-3 μs compared to approximately 100 μs) than the time that would be needed to generate a fresh random code RND. Thus, it is advantageous to provide for having the random code RND be generated prior to the moment it will be required. Considering that after the unlock, the protected memory zone may remain unlocked for a relatively long time, e.g. 5 ms, the new random number code RND is expediently generated during this time period, and it thus becomes ready to be sent before the unlock timeout expires (possibly, during a series of accesses by the external microprocessor).

At the next unlock request, for example after the timeout is lapsed and the protected memory zone is locked again (this may occur before the microprocessor has terminated reading all the desired locations), the external microprocessor 104 has to apply for another unlocking request (back to block 412), that will be serviced by the memory device 102 using the new random number code RND previously generated.

It may happen that a new unlock request is received before the completion of the random number code generation; in case such a new unlock request is received after the unlock (block 434) and before the timeout expires, the new unlock request is ignored or delayed by the memory. The new unlock request may, however, be received before the protected memory zone is unlocked (block 434), for example due to miscommunication between the memory device and the external device. In this second case, if the new unlock request follows the previous one by a time which has been sufficient for the generation of the random number code, the new unlock request can be serviced; on the contrary, if the delay of the new unlock request from the previous one is too short, the new unlock request may not be serviced until the new random number code is generated and ready (block 414).

Figure 5:
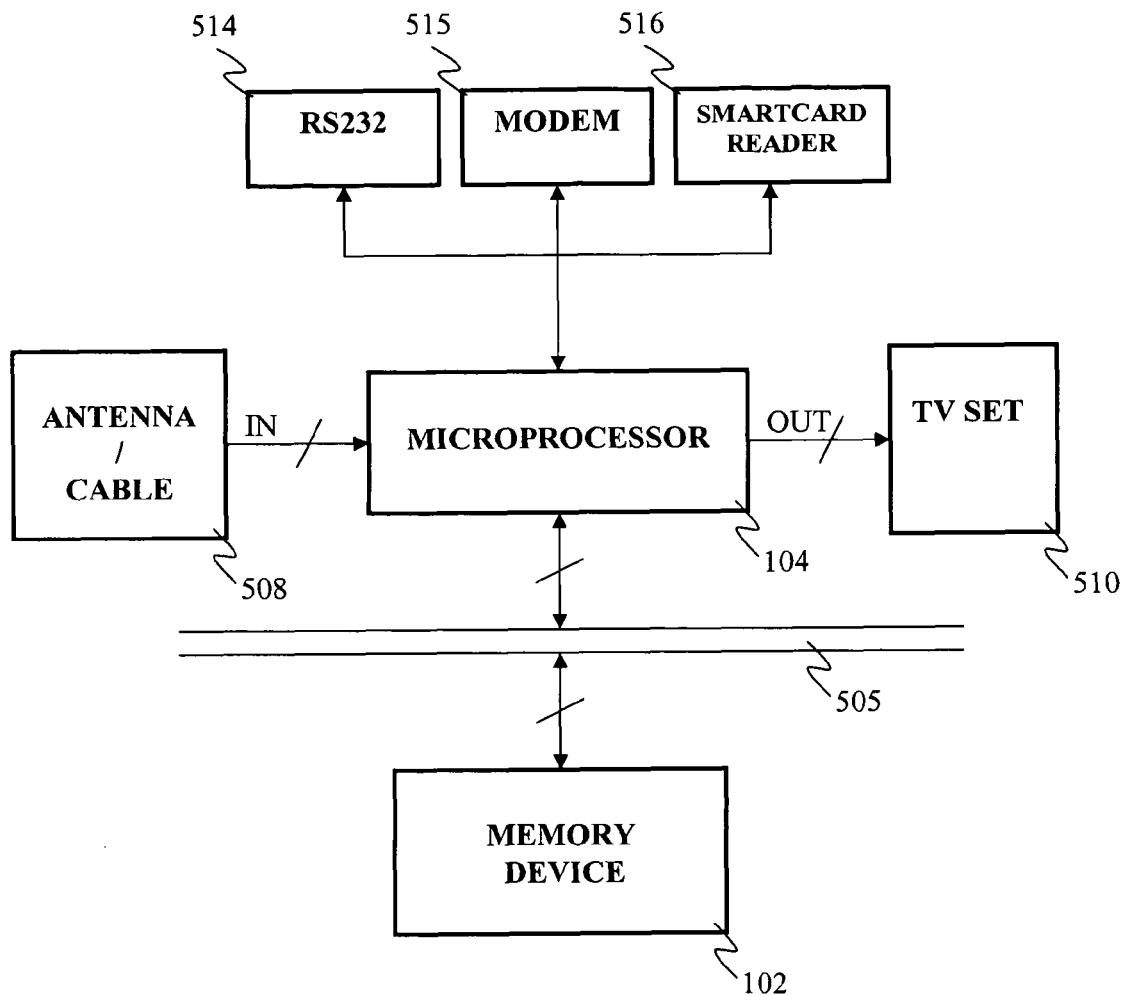
FIG. 5 shows an exemplary application of an embodiment of the present invention.

Referring to FIG. 5, an exemplary application of one or more embodiments of the present invention is illustrated. In particular, FIG. 5 shows a simplified block diagram of an electronic system, for example a set-top box apparatus adapted to cable or satellite or digital terrestrial television, or a DVD player/recorder, or a mobile communications terminal.

The memory device 102 interacts with the external microprocessor 104 by means of a bus of lines 505. The external microprocessor 104 includes an input terminal for receiving, for example, a TV signal IN provided by an antenna or a TV-cable 508, and an output terminal for providing, for example, a TV signal OUT to a TV set 510. The external microprocessor 104 is also connected to a plurality of communication ports, for example a serial port RS232 514, a modem device 515, and a smartcard reader 516. The system may include other peripherals, such as one or more RAM modules, human interface devices (e.g. a keyboard, a display device, a loudspeaker, remote-control input port).

According to a proposed access protocol according to an embodiment of the invention, it is possible to protect reserved code/data stored in the memory device 102 from unauthorized reading. Referring for example to a DVD classic consumer system, the memory device 102 may store in a protected zone thereof the instructions of a new and efficient algorithm of compression which could give advantages in speed or cost of the system. Given that the same memory device 102 may be used in different DVD systems, it may be necessary to shield the data stored therein in an effective way. In the application of set-top box, the security features provided by one or more embodiments of the present invention give the advantage to protect reserved information made available in the system by a service provider. In this case, the additional security provided makes more difficult an unauthorized copying of firmware, thus protecting the interests of the service provider itself.

Although the present invention has been described above with a certain degree of particularity with reference to embodiment(s) thereof, it should be understood that various changes in the form and details as well as other embodiments are possible. Particularly, it is expressly intended that all combinations of those elements and/or method steps that substantially perform the same function in the same way to achieve the same results are within the spirit and scope of the invention.

For example, it is possible to change the code after a predetermined number (more than one) of memory accesses.

Also, nothing prevents that different protected memory zones of a memory device may be unlocked exploiting different unlock passwords (i.e., in the example previously considered, different encryption/decryption keys and/or different encryption/decryption algorithms).

Moreover, the memory device may generate the code, e.g. the random number, and encrypt it, and then send the encrypted code to the external microprocessor; the external microprocessor may then decrypt the received encrypted code and send back the decrypted code to the memory, which then performs a comparison between the generated code and the received code. Stated more generally, at least two encryption processes are performed on a code, e.g. on the random number generated by the memory device, one process at the memory device and another process at the external device wishing to be granted access thereto. Alternatively, the microprocessor may re-encrypt the received code before sending it back to the memory, the re-encryption using a different algorithm than the original encryption by the memory device.

What is claimed is:

1. A method of allowing access to a memory device by an external device, the method including:
receiving at the memory device an access request to a selected storage area by the external device; and
performing an unlock procedure including:
issuing a first code to the external device, the first code issued by the memory device;
sending the first code to the external device;
receiving, from the external device, a second code at the memory device, the second code being generated by a first encryption process performed on the first code to obtain the second code;
at the memory device, temporarily unlocking the selected storage area to allow the external device to access the selected storage area more than once over a predetermined time interval based on the received second code, the temporarily unlocking including performing at least one second encryption process on the second code to obtain the first code;
relocking the storage area after lapse of the predetermined time interval;
changing the first code to a new value; and
unlocking the storage area and granting the external device access to the storage area again for the predetermined time interval in response to verifying the validity of the received second code, as changed based on the new value of the first code.

2. The method of claim 1, in which the performing at least one second encryption process includes:
performing the at least one second encryption process on the received second code to obtain a third code; and
temporarily unlocking conditioned by a comparison of the third code to the first code.

3. The method of claim 2, wherein the allowing the external device access to the selected storage area includes establishing an identity of the third code to the first code.

4. The method of claim 1, in which the temporarily unlocking is conditioned by a comparison of the received second code with a fourth code, the fourth code being used by the memory device for generating the first code by performing the at least one second encryption process.

5. The method of claim 1, in which the performing the first encryption process includes exploiting a predetermined first encryption key.

6. The method according to claim 5, in which the performing the at least second encryption process includes exploiting a predetermined second encryption key.

7. The method according to claim 6, in which the second encryption key is stored in the memory device.

8. An integrated circuit, comprising:
a memory location operable to store data;
a random-number generator coupled to the integrated circuit; and
a data-encryption circuit coupled to the random-number generator and to the integrated circuit, the integrated circuit operable to:
send a first code value to a requestor external to the integrated circuit in response to a first request from the requestor to access the memory location;
receive a second code value from the requestor after sending the first code value, the second code value being an encrypted version of the first code value;
compare the second code value to a predetermined code value;
allow the requestor access to the memory location more than once over a predetermined time interval if the second code value has a predetermined relationship to the predetermined code value;
change the first code value after lapse of the limited time period;
send the changed first code value to the requestor;
receive a changed second code value from the requestor;
compare the changed second code value to a predetermined code value, and
allow the requestor to access the memory location again over the predetermined time interval if the changed second code value has a predetermined relationship to the predetermined code value, the control circuit being further operable to
cause the generator to generate a random number,
cause the data-encryption circuit to encrypt the random number using a predetermined encryption key, and
send to the requestor the encrypted random number as the first code value.

9. The integrated circuit of claim 8, further comprising:
a random-number generator coupled to the control circuit;
a data-encryption circuit coupled to the random-number generator and to the control circuit;
the control circuit being is further operable to
cause the generator to generate a random number,
cause the data-encryption circuit to encrypt the random number using a predetermined encryption key, and
send to the requester the encrypted random number as the first code value.

10. A computer-readable storage device containing instructions that, when executed by a processor, causes the processor to perform a method of allowing access to a memory device by an external device, the method comprising:
receiving at the memory device an access request to a selected storage area by the external device; and
performing an unlock procedure including:
issuing a first code to the external device, the first code issued by the memory device;
sending the first code to the external device;

receiving, from the external device, a second code at the memory device, the second code being generated by a first encryption process performed on the first code to obtain the second code;

at the memory device, temporarily unlocking the selected storage area to allow the external device to access the selected storage area more than once over a predetermined time interval based on the received second code, the temporarily unlocking including performing at least one second encryption process on the second code to obtain the first code;

relocking the storage area after lapse of the predetermined time interval;

changing the first code to a new value; and unlocking the storage area and granting the external device access to the storage area again for the predetermined time interval in response to verifying the validity of the received second code, as changed based on the new value of the first code.

* * * * *